United States Patent [19]
Ando et al.

[11] Patent Number: 5,496,230
[45] Date of Patent: Mar. 5, 1996

[54] CONTROL SYSTEM FOR AUTOMATIC TRANSMISSION

[75] Inventors: Masahiko Ando, Okazaki; Yoshihisa Yamamoto, Nishio; Akira Fukatsu; Mamoru Niimi, both of Anjo; Masato Kaigawa, Toyota; Hidehiro Oba, Aichi; Hiromichi Kimura, Okazaki; Yasuo Hojo, Nagoya; Atsushi Tabata, Okazaki; Kunihiro Iwatsuki, Toyota, all of Japan

[73] Assignees: Aisin AW Co., Ltd.; Toyota Jidosha Kabushiki Kaisha, both of Japan

[21] Appl. No.: 318,896

[22] PCT Filed: Feb. 4, 1994

[86] PCT No.: PCT/JP94/00166

§ 371 Date: Nov. 28, 1994

§ 102(e) Date: Nov. 28, 1994

[87] PCT Pub. No.: WO94/18024

PCT Pub. Date: Aug. 18, 1994

[30] Foreign Application Priority Data

Feb. 8, 1993 [JP] Japan ................................. 5-019996

[51] Int. Cl.$^6$ ............................ B60K 41/06; F16H 61/00
[52] U.S. Cl. ............................................. 477/111; 477/109
[58] Field of Search ........................................ 477/109, 111

[56] References Cited

FOREIGN PATENT DOCUMENTS

| 3-9162 | 1/1991 | Japan . |
| 3-229933 | 10/1991 | Japan . |
| 4-140446 | 5/1992 | Japan . |
| 4-166428 | 6/1992 | Japan . |

*Primary Examiner*—Dirk Wright
*Attorney, Agent, or Firm*—Lorusso & Loud

[57] ABSTRACT

A control system for an automatic transmission, comprising a gear transmission unit for establishing a predetermined gear stage by applying a plurality of frictional engagement elements selectively. The gear transmission unit includes a main transmission portion capable of establishing at least a reverse gear stage, and an auxiliary transmission portion capable of switching a high gear stage and a low gear stage. The auxiliary transmission portion is set to the high stage at the shifting time to the reverse stage. The reverse stage is established by controlling the application of predetermined frictional engagement elements of the main transmission portion when a reverse stage shifting command is generated. A torque-down of an engine is executed at the time of controlling the engagement of the frictional engagement elements for the reverse stage. The auxiliary transmission portion is set to the high stage by controlling the applications of predetermined frictional engagement elements of the auxiliary transmission portion when the reverse stage in the main transmission portion is detected. A signal to end the engine torque-down is sent when a shift of the auxiliary transmission portion to the high stage is detected.

1 Claim, 8 Drawing Sheets

FIG. 4

| | C0 | C1 | C2 | B0 | B1 | B2 | B3 | B4 | F0 | F1 | F2 |
|---|---|---|---|---|---|---|---|---|---|---|---|
| N | | | | (○) | | | | | | | |
| Rev | | | ○ | ○ | | | | ○ | | | |
| 1st | ○ | ○ | | | | | | ● | ○ | | ○ |
| 2nd | ● | ○ | | | | | ○ | | ○ | | |
| 3rd | ○ | ○ | | | ● | ○ | | | ○ | ○ | |
| 4th | ○ | ○ | ○ | | | | | | ○ | | |
| 5th | | ○ | ○ | ○ | | | | | | | |

स्‍5,496,230

CONTROL SYSTEM FOR AUTOMATIC TRANSMISSION

TECHNICAL FIELD

The present invention relates to a control system for establishing a reverse gear stage in an automatic transmission having a main transmission portion and an auxiliary transmission portion.

BACKGROUND ART

There has been widely known in the prior art an automatic transmission which is equipped with a gear transmission mechanism and a plurality of frictional engagement elements to be selectively applied by the action of a hydraulic control unit so that any of a plurality of gear stages including a reverse stage may be established.

In this automatic transmission, a serious load torque is applied to the frictional engagement elements especially at the reverse time having a high gear ratio. Thus, there have been proposed a variety of counter-measures For the serious load torque.

Japanese Patent Laid-Open No. 129162/1991 has disclosed a system which is enabled to improve the durability of the frictional engagement elements and reduce the size of the frictional engagement elements by decreasing the engine torque when the reverse gear stage is established.

Moreover, Japanese Patent Laid-Open No. 166428/1992 has disclosed a system which is enabled to reduce the load torque when the reverse gear stage is established or maintained, by setting the auxiliary transmission portion to the high gear stage when the reverse stage is established.

incidentally, in case the engine torque-down to be effected when the reverse stage is established is executed by delaying the ignition time, for example, the timing for the delay is restricted of itself from the standpoint of preventing the overheat. This makes it impossible to continue the reduction of the load torque for a long time after the establishment of the reverse stage.

In case, moreover, the auxiliary transmission portion is set to the high gear stage, the number of the frictional engagement elements to be applied for the shift to the reverse stage is increased to drop the line pressure for the application thereby to elongate the time period till the application end (i.e., the establishment of the reverse stage) and to elongate the time period for the applications. As a result, the durability of the frictional engagement elements is not always improved.

DISCLOSURE OF THE INVENTION

The present invention has been conceived in view of the foregoing problems of the prior art and has an object to solve the problems by providing a control system for an automatic transmission, which is enabled to reduce the load torque of frictional engagement elements at a reverse time by solving the problems of the cases, in which the torque-down of an engine is to be executed and in which an auxiliary transmission portion is to be set to a high gear stage, and by extracting the individual advantages effectively.

According to the present invention having the gist, as shown in FIG. 1, the aforementioned problems are solved by providing a control system for an automatic transmission, comprising a gear transmission unit for establishing a predetermined gear stage by applying a plurality of frictional engagement elements selectively, wherein said gear transmission unit includes a main transmission portion capable of establishing at least a reverse gear stage, and an auxiliary transmission portion capable of switching a high gear stage and a low gear stage, and wherein said auxiliary transmission portion is set to the high gear stage at the shifting time to the reverse gear stage, wherein the improvement comprises: means for detecting generation of a command for shifting to the reverse gear stage; reverse stage establishment control means for establishing the reverse gear stage by controlling the application of predetermined ones of said frictional engagement elements of said main transmission portion when the reverse stage shifting command is generated; engine torque control means for executing a torque-down of an engine at the time of controlling the engagement of said frictional engagement elements for establishing the reverse gear stage; means for detecting establishment of the reverse gear stage in said main transmission portion; means for setting said auxiliary transmission portion to the high gear stage by controlling the applications of predetermined ones of said frictional engagement elements of said auxiliary transmission portion in response to the detected output of said means; means for detecting a shift of said auxiliary transmission portion to the high gear stage; and means for sending a signal to end the engine torque-down to said engine torque control means in response to the detected output of said means.

According to the control system for the automatic transmission of the present invention, for shifting to the reverse gear stage, the torque-down is executed so that the frictional engagement elements of the main transmission portion are applied to establish the reverse stage. At this stage, the frictional engagement elements of the auxiliary transmission portion are not set to the high gear stage. At the shifting time, therefore, an allowance is made in the line pressure because no oil pressure has to be fed to the frictional engagement elements of the auxiliary transmission portion, so that the applications of the frictional engagement elements take no tiptoe. At the same time, the torque-down of the engine is executed at the shifting time so that the load torque is reduced.

Moreover, when the reverse stage is established in the main transmission portion, then the auxiliary transmission portion has their frictional engagement elements applied so that it is set to the high gear stage. Since, at this stage, the frictional engagement elements of the main transmission portion have already been applied, there arises no problem of the line pressure drop. As the auxiliary transmission portion shifts to the high gear stage, the engine torque-down control is stopped so that the engine is run to generate an ordinary torque. Since, at this stage, the auxiliary transmission portion is set at the high gear stage, the gear ratio is lowered to reduce the load torque of the frictional engagement elements establishing the reverse stage. As a result, the reverse stage can be sufficiently maintained even if the frictional engagement elements are small-sized, and the durability can be improved.

As has been described hereinbefore, the control system for an automatic transmission of the present invention is constructed such that only the frictional engagement elements of the main transmission portion are applied together with the torque-down at the shifting time to the reverse stage and such that the torque down is ended by setting the auxiliary transmission portion to the high gear stage when the reverse stage is established in the main transmission portion. As a result, the line pressure is prevented from dropping at the shifting time so that the applications of the frictional engagement elements can be prevented from taking long time. Moreover, the load torque of the frictional engagement elements can always be reduced for the time period from the shifting stage to the shifting end. As a result, the frictional engagement elements can have their durability improved.

BRIEF DESCRIPTION OF DRAWINGS

FIG. 4 is an operation chart tabulating the individual frictional engagement elements in the aforementioned automatic transmission:

BEST MODE FOR CARRYING OUT THE INVENTION

An embodiment of the present invention will be described in detail in the following with reference to the accompanying drawings.

First of all, a specific embodiment of a vehicular automatic transmission system, to which is applied the present invention, will be described with reference to FIGS. 2 to 4.

Figure 1:
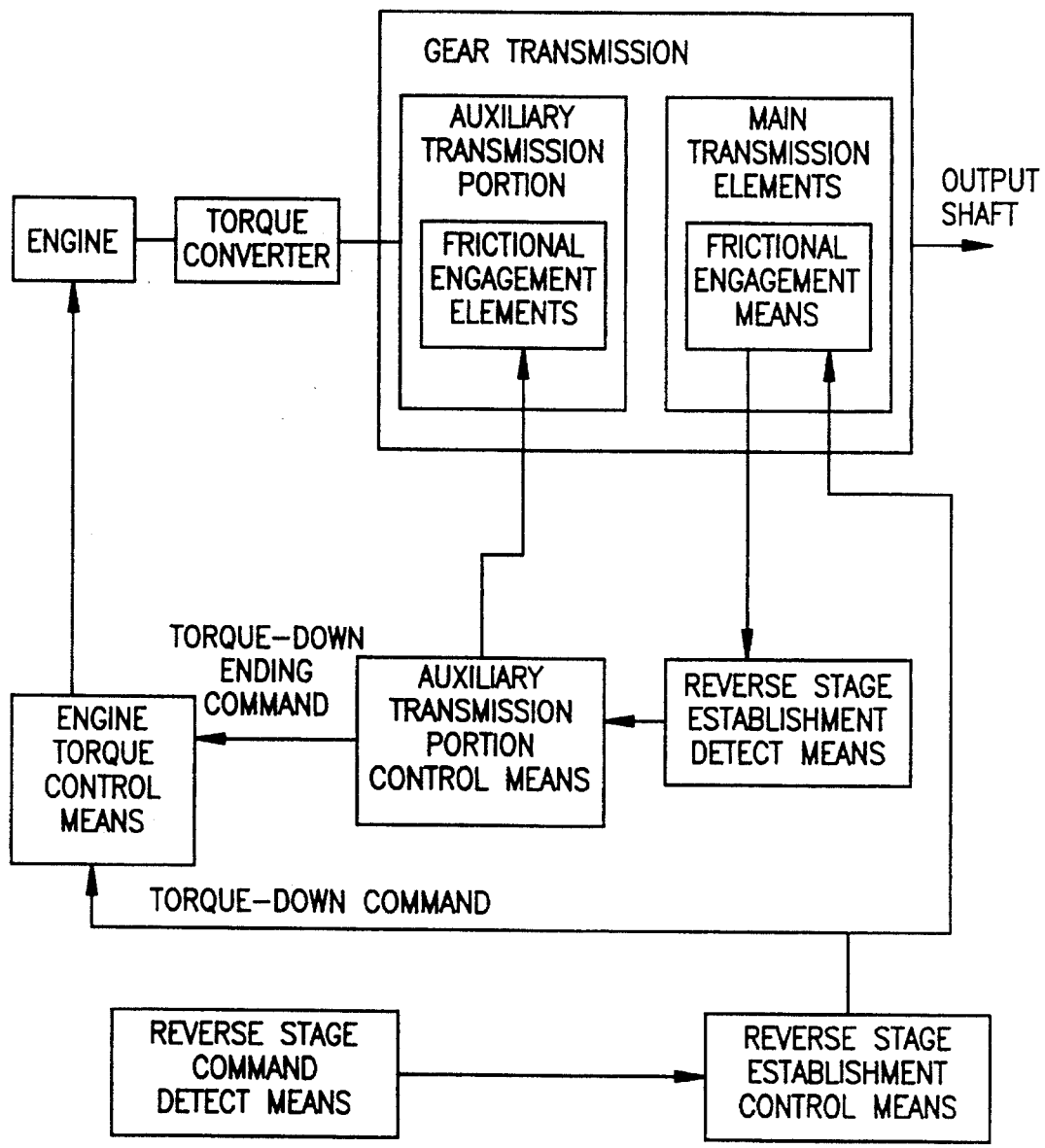
FIG. 1 is a block diagram showing the gist of the present invention.
Figure 2:
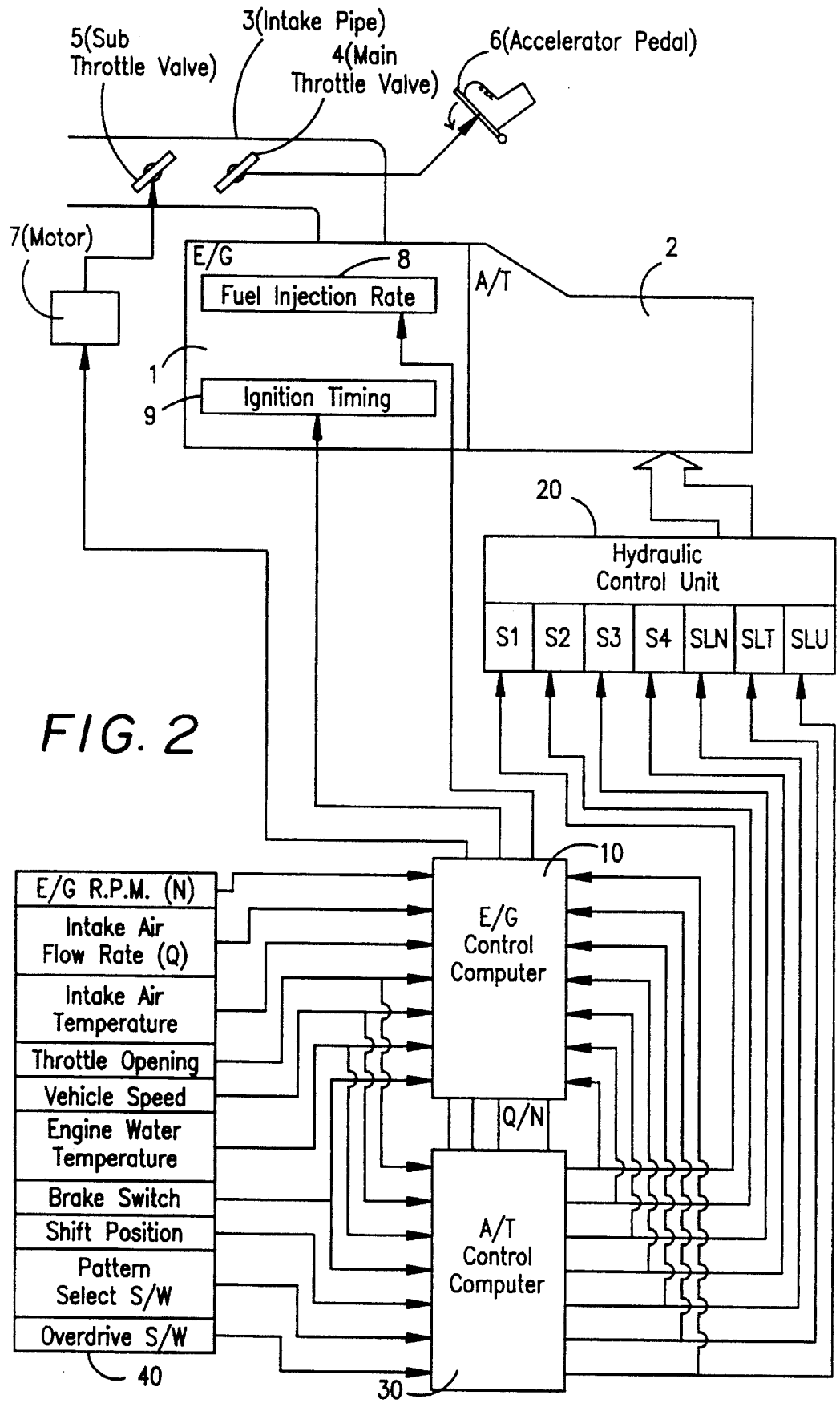
FIG. 2 is a schematic block diagram showing a vehicular automatic transmission system to which is applied the present invention.

The automatic transmission system, as shown in FIG. 2, is constructed to include an engine (E/G) 1, an automatic transmission (A/T) 2, an engine (E/G) control, computer 10, a hydraulic control unit for the automatic transmission, an automatic transmission (A/T) control computer 30, and a group of various sensors 40. On the basis of input data coming from the various sensors 40, the E/G control computer 10 and the A/T control computer 30 control the engine 1 and the automatic transmission 2 individually.

The engine 1 has its intake pipe 3 equipped with a main throttle valve 4 and a sub throttle valve 5, of which the main throttle valve 4 has its opening controlled in association with an accelerator pedal 6 whereas the sub throttle valve 5 has its opening controlled by an actuator (or motor) 7.

On the other hand, the engine 1 is equipped with a mechanism 8 for adjusting a fuel injection rate and a mechanism 9 for adjusting an ignition timing. The E/G control computer 10 controls the aforementioned sub throttle valve 5, fuel injection rate control mechanism 8 and ignition timing control mechanism 9 to adjust the engine output, for example, in the well-known manner.

Figure 3:
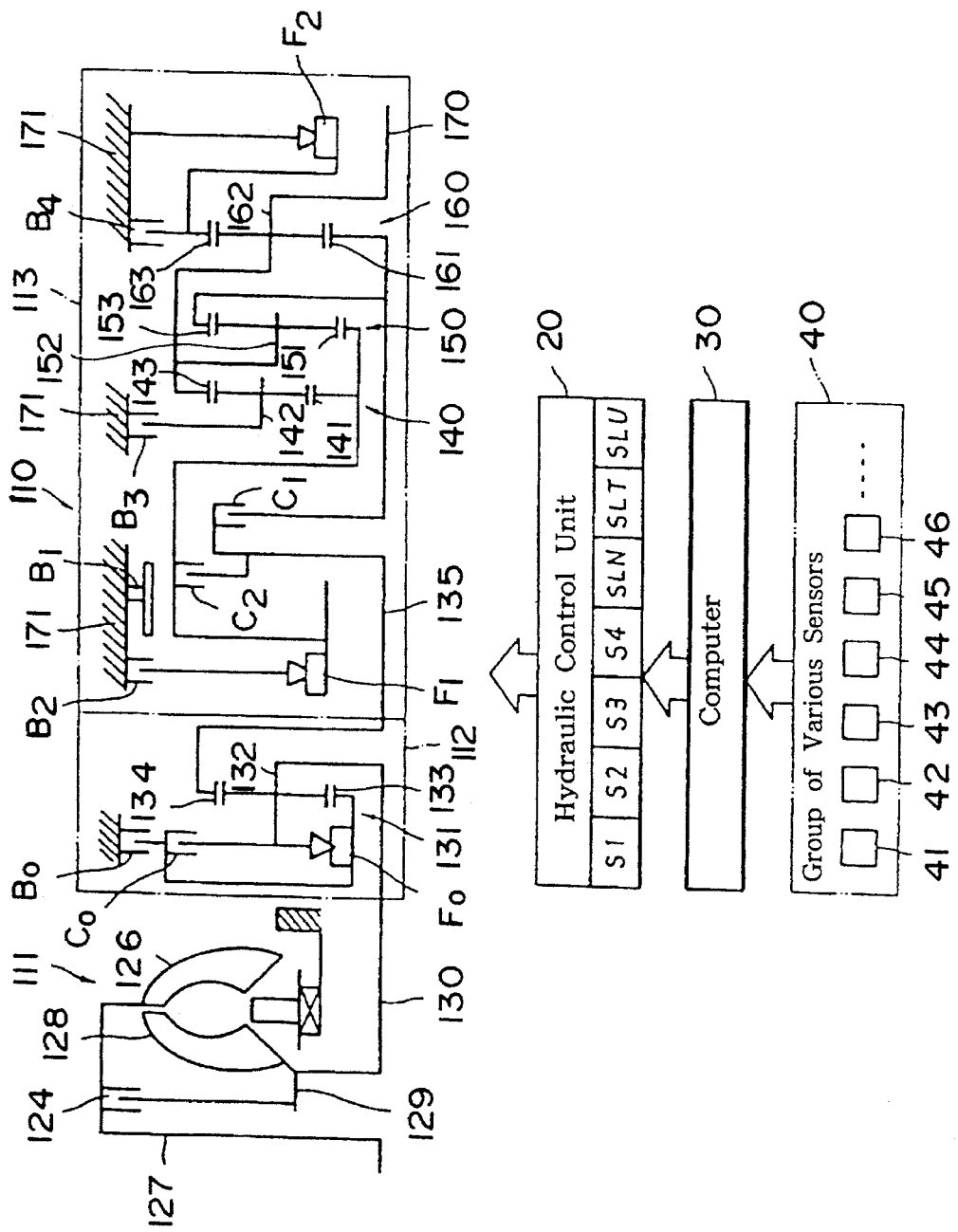
FIG. 3 is a schematic block diagram showing an automatic transmission in the aforementioned automatic transmission system.

FIG. 3 is a skeleton diagram of the automatic transmission 2. This automatic transmission 2 is equipped with a torque converter 111, an auxiliary transmission portion (or overdrive portion) 112 and a main transmission portion (or underdrive portion) 113.

The aforementioned torque converter 111 is equipped with a lockup clutch 124. This lockup clutch 124 is interposed between a front cover 127 integrated with a pump impeller 126 and a member (or hub) 129 integrally attached to a turbine runner 128.

The engine 1 has its (not-shown) crankshaft connected to the front cover 127. An input shaft 130 connected to the turbine runner 128 is further connected to a carrier 132 of an overdrive planetary gear mechanism 131 constituting the auxiliary transmission portion 112.

Between the carrier 132 of the planetary gear mechanism 131 and a sun gear 133, there are interposed a clutch C0 and a one-way clutch F0. This one-way clutch F0 Is applied in case the sun gear 133 turns Forward (i.e., in the direction of rotation of the input shaft 130) relative to the carrier 132.

On the other hand, there is provided a brake B0 For stopping the rotation of the sun gear 133 selectively. Moreover, a ring gear 134 acting as the output element of the auxiliary transmission portion 112 is connected to an intermediate shaft 135 acting as the input element of the main transmission portion 113.

In the auxiliary transmission portion 112, with the clutch C0 or the one-way clutch F0 being applied, the planetary gear mechanism 131 rotates in its entirety so that the intermediate shaft 135 rotates at the same speed as that of the input shaft 130. With the brake B0 being applied to stop the rotation of the sun gear 133, the ring gear 134 has its forward rotation accelerated with respect to the input shaft 130. In short, the auxiliary transmission portion 112 can be switched between two high and low stages.

The aforementioned main transmission portion 113 is equipped with three sets of planetary gear mechanisms 140, 150 and 160, which are connected in the following manner.

Specifically, the sun gear 141 of the first planetary gear mechanism 140 and the sun gear 151 of the second planetary gear mechanism 150 are integrally connected to each other, and the ring gear 143 of the first planetary gear mechanism 140, the earlier 152 of the second planetary gear mechanism 150 and the carrier 162 of the third planetary gear mechanism 160 are connected to one another. On the other hand, an output shaft 170 is connected to the carrier 162 of the third planetary gear mechanism 160. Moreover, the ring gear 153 of the second planetary gear mechanism 150 is connected to the sun gear 161 of the third planetary gear mechanism 160.

The gear train or this main transmission portion 113 is enabled to set one reverse and four forward gear stages by the clutches and brakes, as will be described in the following, Specifically, a clutch C1 is interposed between the ring gear 153 of the second planetary gear mechanism 150 and the sun gear 161 of the third planetary gear mechanism 160, and the intermediate gear 135, and a clutch C2 is interposed between the sun gear 141 of the first planetary gear mechanism 140 and the sun gear 151 of the second planetary gear mechanism 150, and the intermediate gear 135.

There is arranged a brake B1 for stopping the rotations of the sun gears 141 and 151 of the first planetary gear mechanism 140 and the second planetary gear mechanism 150. Between these sun gears 141 and 151 and a casing 171, moreover, there are arrayed in series a one-way clutch F1 and a brake B2. Of these, the one-way clutch F1 is applied when the sun gears 141 and 151 are to rotate backward (i.e., in the opposite direction to the rotating direction of the input shaft 135).

Between the carrier 142 of the first planetary gear mechanism 140 and the casing 171, there is interposed a brake B3.

As an element for stopping the rotation of the ring gear 163 of the third planetary gear mechanism 160, there are arranged a brake B4 and a one-way clutch F2 which are interposed in parallel between the ring gear 163 and the casing 171. Incidentally, the one-way clutch F2 is applied when the ring gear 163 is to rotate backward.

In the automatic transmission 2 thus constructed, one reverse and five forward gear stages are established as a whole.

An application chart of the individual clutches and brakes (i.e., frictional engagement elements) for setting those Five gear stages is exemplified in FIG. 4. Incidentally, in FIG. 4: symbol ○ indicates the applied state; symbol ● indicates the applied state at an engine braking time; and blanks indicate the released state.

The applications or releases of the individual clutches and brakes (i.e., frictional engagement elements) are executed by driving and controlling the solenoid valves S1, S2, S3, S4, SLN, SLT and SLU in the hydraulic control unit 20 on the basis of commands coming from the computer 30.

Here: the valves S1, S2 and S3 are shifting solenoid valves; the valve S4 is an engine braking solenoid valve; the valve SLN is an accumulator back pressure controlling solenoid valve; the valve SLT is a line pressure controlling solenoid valve; and the valve SLU is a lockup solenoid valve.

The A/T control computer 30 is fed with the signals coming from the various sensors 40, such as: basic signals including a vehicle speed signal (i.e., a signal of an output shaft R.P.M. N0) coming from a vehicle speed sensor 41, a throttle opening signal (i.e., an accelerator opening signal) coming from a throttle sensor 42, a pattern select signal (i.e., a select signal for a power stressed run or a fuel economy stressed run selected by the driver) coming from a pattern select switch 43, a shift position signal coming from a shift position switch 44, and a foot brake signal coming from a brake switch 45; and an R.P.M. signal of the clutch C0 coming from a C0 sensor 46.

Figure 5:
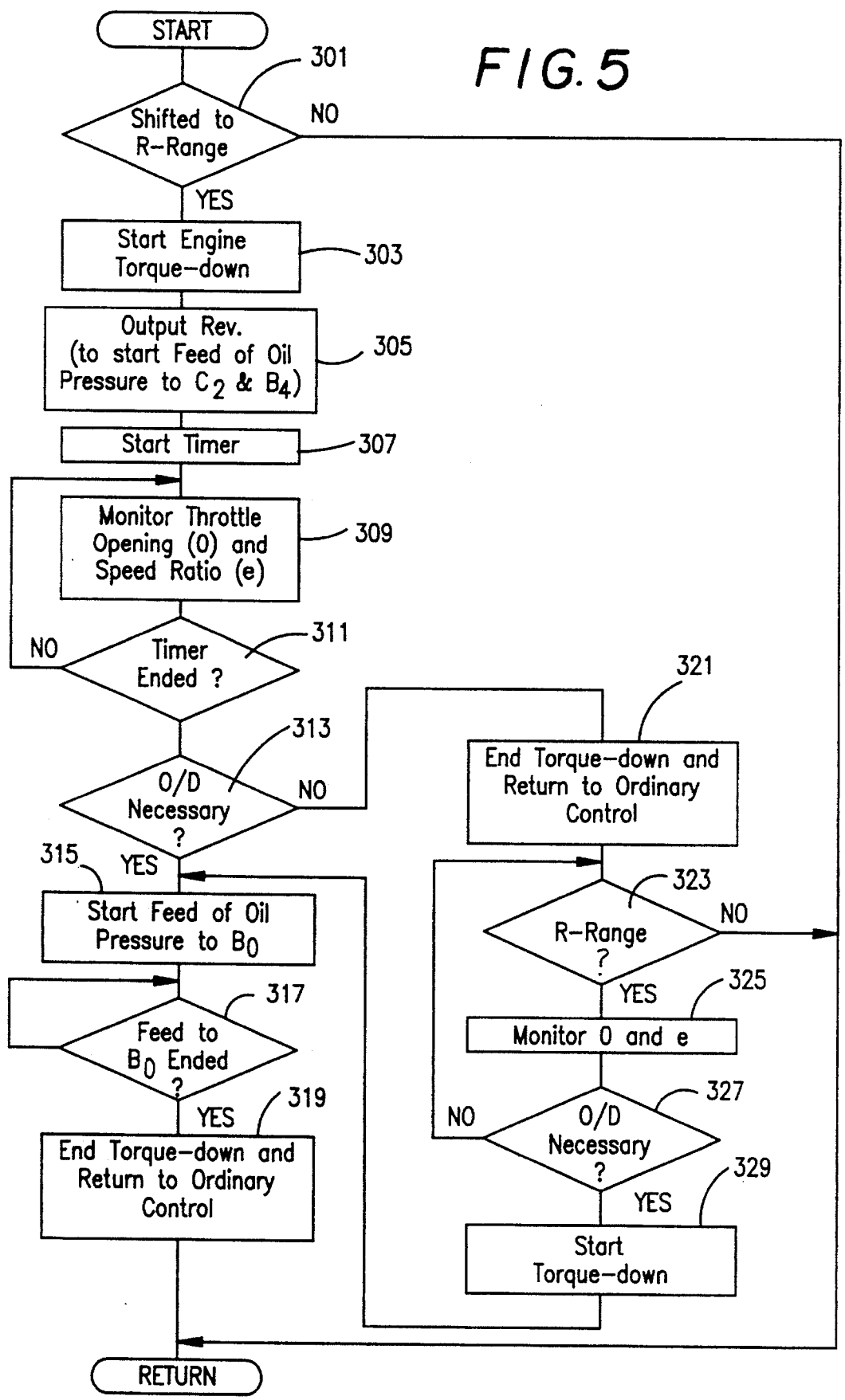
FIG. 5 is a flow chart illustrating one example of the control routine of the same embodiment.

Next, one example of the controls to be executed by the A/T control computer 30 will be described with reference to the flow chart of FIG. 5.

In this control example, when the routine is started, it is decided at first Step 301 whether or not the shift position has been shifted to the R-range (i.e., reverse range). If the shift is not to the R-range, the routine is returned to another control routine (i.e., main routine).

If the shift is to the R-range, the routine advances to Step 303, at which the engine torque-down is started. At Step 305, a signal for executing the reverse is outputted to start the feed of oil pressure to the clutch C2 and the brake B4 for establishing the reverse stage. Next, at Step 307, a timer for deciding the establishment of the reverse stage is started. After this, at Step 309, a throttle opening θ and a speed ratio (i.e., the ratio of the turbine R.P.M. to the engine R.P.M.) of the torque converter are monitored. At Step 311, it is decided whether or not a timer has been ended.

Figure 6:
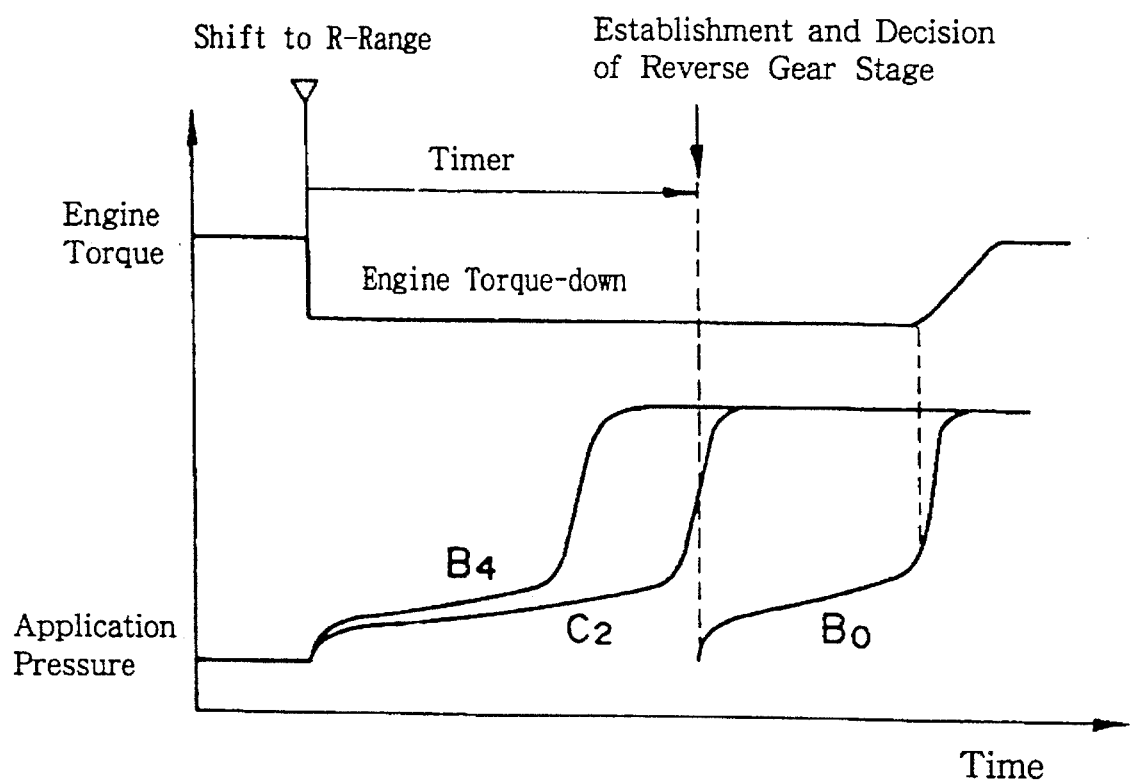
FIG. 6 is a characteristic diagram to be used for explaining the control of the same embodiment.

This timer has its count-up value set at the time period (or a slightly shorter time period while considering the dispersion or the like) from the start of feed of the oil pressure to the clutch C1 and the brake B4, as shown in FIG. 6, to the applications of the clutch C1 and the brake B4. When this timer ends its counting operation, it is decided that a main transmission portion 110 has established the reverse stage.

Figure 7:
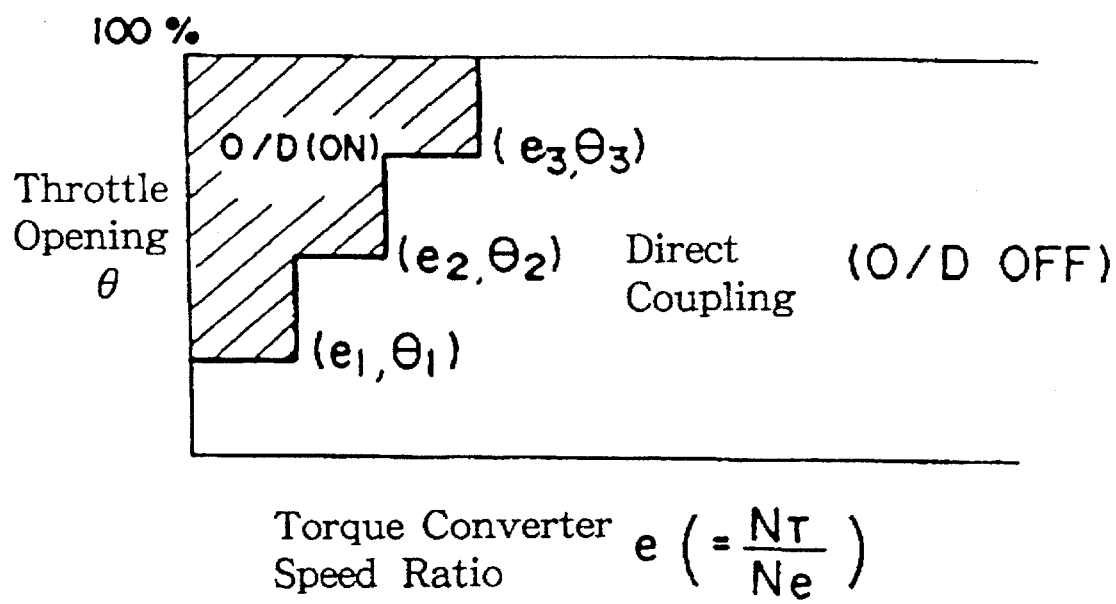
FIG. 7 is an O/D decide diagram to be used for the control of the same embodiment.

When it is decided that the reverse stage has been established, the routine advances to Step 313, at which it is decided whether or not the auxiliary transmission portion 111 has to be shifted to a higher gear stage, i.e., to the overdrive (O/D). This decision is made on the basis of the relation between the throttle opening θ and the speed ratio e, as shown in FIG. 7. The hatched portion of FIG. 7 presents the zone "requiring the O/D", in which it is decided that "O/D is necessary", and the routine advances to Step 315. At Step 315, the feed of the oil pressure to the brake B0 of the auxiliary transmission portion 111. At Step 317, it is awaited (i.e., may be decided by the timer) that the feed of the oil pressure to the brake B0 has been ended. If this feed is ended, the routine advances to Step 319, at which the torque-down of the engine is ended, and the routine is returned to the ordinary engine drive control, i.e., to the other routine.

If, on the other hand, it is decided at Step 313 that the O/D is unnecessary, the routine advances to Step 321, at which the torque-down control is ended to restore the ordinary control. At Step 323, it is decided again whether the shift is to the R-range. Since, the condition For "O/D Is necessary" may always arise during the R-range, it is monitored at Step 325 and S327 by monitoring the throttle opening θ and the speed ratio e. When the condition for "O/D is necessary" is entered, the torque-down is started, and the routine advances to Step 315, at which the auxiliary transmission portion is switched to the higher gear ratio.

In case the shift is thus made to the R-range, the torque-down is executed, and the oil pressure is fed in this state to the frictional engagement elements, i.e., the clutch C0 and the brake B1 so that the reverse stage of the main transmission portion 110 may be established. When the reverse stage is established in the main transmission portion 110, the oil pressure is fed to the frictional engagement element or the brake B0 of the auxiliary transmission portion 111 so that the auxiliary transmission portion 111 is set to the higher gear stage (i.e., overdrive). In accordance with this, the torque-down control is ended.

Thus, what is required at the shifting time to the reverse stage is to feed the oil pressure to the two frictional engagement elements, i.e., the clutch C0 and the brake B0 so that an allowance is left in the line pressure. At this time, moreover, the torque-down is caused so that the load torque is reduced. Once the reverse stage is achieved, the auxiliary transmission portion 111 is set to the high stage although no torque-down is executed, so that the load torque is also reduced. As a result, the frictional engagement elements can be small-sized and improved in durability.

Figure 8:
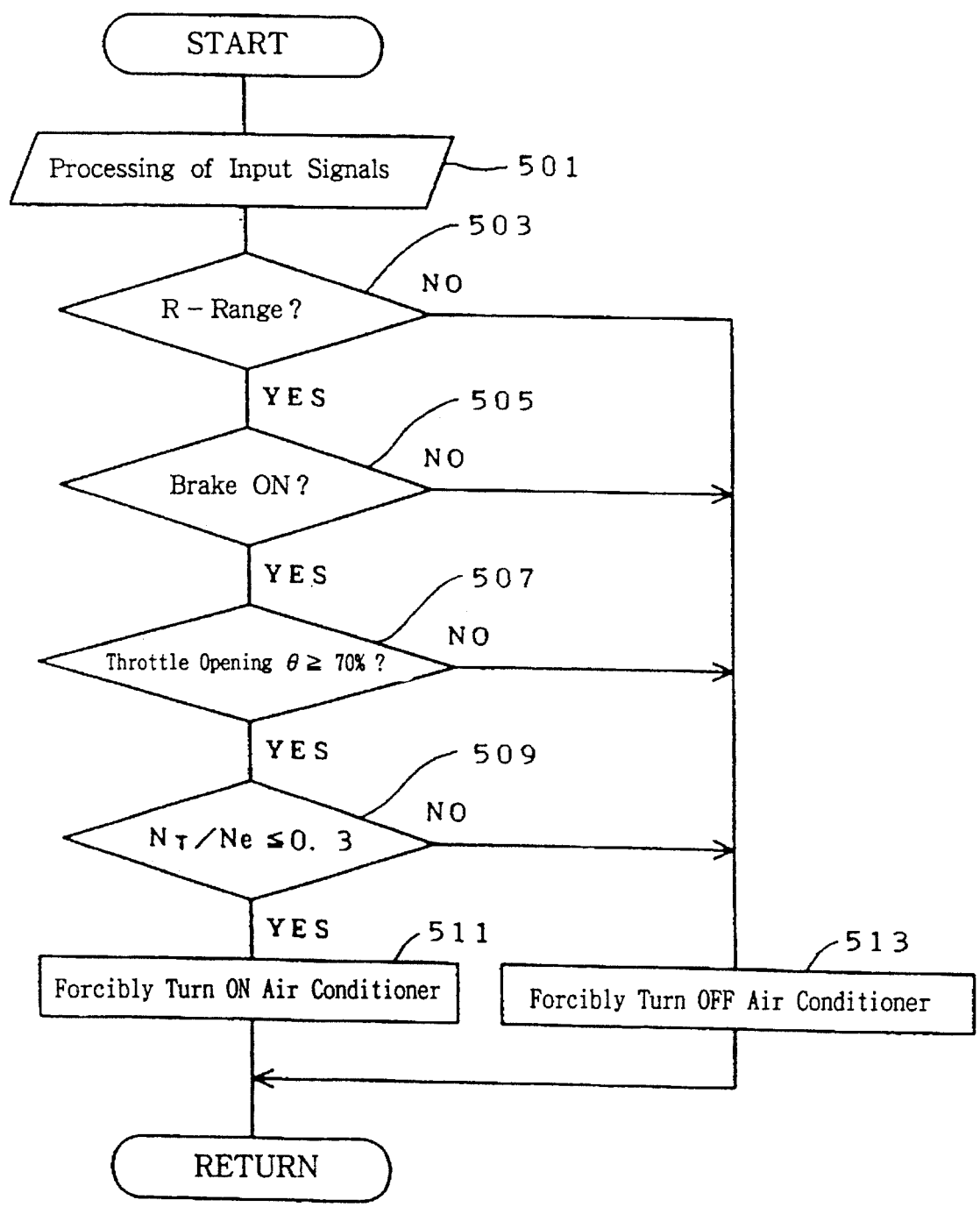
FIG. 8 is a control flow chart illustrating the countermeasures at a stall time, which are effective when executed together with the controls of the same embodiment.

With reference to the flow chart of FIG. 8, here will be described another torque-down method which is to be executed together with the controls of the foregoing embodiment. This torque-down method is effective at the stall time and can be executed together with the aforementioned shift controls.

When this control is started, the input signals are processed at Step S01. Next, whether or not the stall is conditioned is decided at Steps 503 to 509.

The conditions for the stall are:

① R-range;

② Brake ON;

③ Throttle Opening θ≧70%; and

④ Ratio of Turbine R.P.M. NT to Engine R.P.M. Ne ≦0.3.

If all these conditions are YES, it is decided that the stall has occurred. If any of the conditions is not satisfied, it is decided that the stall does not occur. As the case may be, however, any condition (e.g., ②) may be omitted, and the numerical values in the conditions may be changed.

If it is decided that the stall has occurred, the routine advances to Step 511, at which an external accessory load such as an air conditioner is forcibly turned ON so as to distribute the engine output to somewhere thereby to reduce the torque to be inputted to the automatic transmission. It is quite natural that any load other than the air conditioner may be turned ON.

If, on the other-hand, it is decided that no stall has occurred, or if any of the above-specified conditions fails to be satisfied, the routine advances to Step 513, at which the forced ON of the air conditioner is interrupted.

We claim:

1. A control system for an automatic transmission, comprising a gear transmission unit for establishing a predetermined gear stage by applying a plurality of frictional engagement elements selectively, wherein said gear transmission unit includes a main transmission portion capable of establishing at least a reverse gear stage, and an auxiliary transmission portion capable of switching a high gear stage and a low gear stage, and wherein said auxiliary transmission portion is set to the high gear stage at the shifting time to the reverse gear stage, wherein the improvement comprises:

means for detecting generation of a command for shifting to the reverse gear stage;

reverse stage establishment control means for establishing the reverse gear stage by controlling the application of predetermined ones of said frictional engagement elements of said main transmission portion when the reverse stage shifting command is generated;

engine torque control means for executing a torque-down of an engine at the time of controlling the engagement of said frictional engagement elements for establishing the reverse gear stage;

means for detecting establishment of the reverse gear stage in said main transmission portion;

means for setting said auxiliary transmission portion to the high gear stage by controlling the applications of predetermined ones of said frictional engagement elements of said auxiliary transmission portion in response to the detected output of said means;

means for detecting a shift of said auxiliary transmission portion to the high gear stage; and means for sending a signal to end the engine torque-down to said engine torque control means in response to the detected output of said detecting means.

* * * * *

UNITED STATES PATENT AND TRADEMARK OFFICE
CERTIFICATE OF CORRECTION

PATENT NO.   : 5,496,230
DATED        : March 5, 1996
INVENTOR(S)  : ANDO et al

It is certified that error appears in the above-indentified patent and that said Letters Patent is hereby corrected as shown below:

Col. 1, line 21, "For" should read --for--;
       line 34, "incidentally" should read --Incidentally--.

Col. 2, line 38, "tiptoe" should read --time--.

Col. 3, line 43, "control," should read --control--.

Col. 4, line 13, "Is" should read --is--;
       line 14, "Forward" should read --forward--;
       line 38, "earlier" should read --carrier--;
       line 45, "or" should read --of--; and
       line 49, "ing," should read --ing.--.

UNITED STATES PATENT AND TRADEMARK OFFICE
CERTIFICATE OF CORRECTION

PATENT NO. : 5,496,230
DATED : March 5, 1996
INVENTOR(S) : Ando et al

It is certified that error appears in the above-indentified patent and that said Letters Patent is hereby corrected as shown below:

Col. 5, line 11, "delete "Five" insert --five--.

Col. 6, line 20, "For" should read --for-- and "Is" should read --is--.

Signed and Sealed this

Fifteenth Day of October, 1996

Attest:

BRUCE LEHMAN

Attesting Officer     Commissioner of Patents and Trademarks